United States Patent

Stavermann

[11] Patent Number: 5,988,673
[45] Date of Patent: Nov. 23, 1999

[54] ARRANGEMENT OF AN INFLATABLE HEAD PROTECTION SYSTEM IN A MOTOR VEHICLE

[75] Inventor: Joerg Stavermann, Munich, Germany

[73] Assignee: Bayerische Motoren Werke Aktiengesellschaft, Munich, Germany

[21] Appl. No.: 09/161,222

[22] Filed: Sep. 28, 1998

Related U.S. Application Data

[63] Continuation of application No. PCT/EP97/00572, Feb. 10, 1997, abandoned.

[30] Foreign Application Priority Data

Mar. 27, 1996 [DE] Germany .......................... 196 12 227

[51] Int. Cl.$^6$ ............................. B60R 21/04; B60R 21/22
[52] U.S. Cl. ........................................ 280/730.1; 280/751
[58] Field of Search ............................. 280/730.2, 730.1, 280/728.2, 728.3, 732, 751, 752

[56] References Cited

U.S. PATENT DOCUMENTS

| | | | |
|---|---|---|---|
| 2,834,606 | 5/1958 | Bertrand | 280/730.1 |
| 4,966,388 | 10/1990 | Warner et al. | 280/730 |
| 5,322,322 | 6/1994 | Bark et al. | 280/730 |
| 5,324,074 | 6/1994 | Christian et al. | 280/728 R |
| 5,480,181 | 1/1996 | Bark et al. | 280/730.2 |

FOREIGN PATENT DOCUMENTS

| | | |
|---|---|---|
| 0 694 444 | 1/1996 | European Pat. Off. . |
| 0 705 738 | 4/1996 | European Pat. Off. . |
| 2 238 343 | 2/1975 | France . |
| 2 345 316 | 10/1977 | France . |
| 34 22 263 | 12/1985 | Germany . |
| 41 37 691 | 11/1992 | Germany . |
| 42 38 427 | 5/1993 | Germany . |
| 43 04 919 | 9/1993 | Germany . |
| 43 07 175 | 9/1993 | Germany . |
| 43 08 693 | 9/1993 | Germany . |
| 42 32 658 | 3/1994 | Germany . |
| 43 35 073 | 4/1994 | Germany . |
| 195 19 297 | 12/1995 | Germany . |
| 44 26 848 | 2/1996 | Germany . |
| 295 19 540 | 4/1996 | Germany . |
| 296 03 316 | 8/1996 | Germany . |
| 296 05 897 | 9/1996 | Germany . |
| 296 10 920 | 10/1996 | Germany . |
| 07117605 | 5/1995 | Japan . |
| 08310335 | 11/1996 | Japan . |
| 2 191 450 | 12/1987 | United Kingdom . |
| 2 261 636 | 5/1993 | United Kingdom . |
| 2 278 812 | 12/1994 | United Kingdom . |
| 94/19215 | 9/1994 | WIPO . |

*Primary Examiner*—Peter C. English
*Attorney, Agent, or Firm*—Evenson, McKeown, Edwards & Lenahan, P.L.L.C.

[57] ABSTRACT

An inflatable head protection system has an air bag which is provided at least partly along a member or a column of the vehicle body in the non-inflated condition following its course. This air bag is held by a separate deformation element which is constructed as a shaped sheet metal part having at least one deformation curvature, in which case the air bag is housed essentially between the deformation element and the member/the column. An optimal protection is therefore ensured in the static as well as in the dynamic case.

20 Claims, 2 Drawing Sheets

ARRANGEMENT OF AN INFLATABLE HEAD PROTECTION SYSTEM IN A MOTOR VEHICLE

CROSS-REFERENCE TO RELATED APPLICATIONS

This application is a continuation of PCT Application No. PCT/EP97/00572 filed on Feb. 10, 1997, now abandoned, the disclosure of which is expressly incorporated by reference herein.

This application claims the priority of German patent document 196 12 227.9, filed Mar. 27, 1996, the disclosure of which is expressly incorporated by reference herein.

This application is related to application Ser. No. 09/161,470 filed on Sep. 28, 1998 in the name of Andreas FALLMANN and Joerg STAVERAANN for ARRANGEMENT OF AN INFLATABLE HEAD-PROTECTION SYSTEM IN A MOTOR VEHICLE and application Ser. No. 09/161,475 filed on Sep. 28, 1998 in the name of Joerg STAVERMANN for ARRANGEMENT OF AN INFLATABLE LATERAL HEAD PROTECTION SYSTEM IN A MOTOR VEHICLE.

BACKGROUND OF THE INVENTION

The invention relates to the arrangement of an inflatable head protection system in a motor vehicle, having an air bag which is provided at least partly along a member or a column of the vehicle body and, in the non-inflated condition, follows its course. Only in the manner of an example, reference is made to International Patent Document WO 94/19215 with respect to the known state of the art.

An inflatable head protection system offers protection to the occupants of the motor vehicle if the air bag is in fact inflated or has been inflated. However, cases are also conceivable in which a vehicle occupant strikes, particularly with his head, against a vehicle body column or a member, particularly a roof member, without the occurrence of a previous activating of the inflatable head protection system. These types of cases must also be covered not only while taking into account legally stipulated static head impact tests. It is basically known that the requirements of these head impact tests can be met by energy-absorbing pads—as a rule, these are plastic material foam systems—in the area of the roof pillars and of the upper side frame of a normal passenger car. If now these two known systems, specifically energy-absorbing pads, on the one hand, and an inflatable air bag, on the other hand, were simply combined with one another, a relatively large amount of space would be required for this purpose. As a result, the so-called comfort measurements, that is, the inside dimensions of the motor vehicle/passenger car would be limited considerably.

It is therefore an object of the invention to provide remedial measures for solving the described problems.

SUMMARY OF THE INVENTION

This and other objects have been achieved according to the present invention by providing an arrangement of an inflatable head protection system in a motor vehicle, having an air bag which is provided at least partly along a member or a column of the vehicle body in a non-inflated condition following the course of said member or column, wherein the air bag is held by a separate deformation element.

This and other objects have been achieved according to the present invention by providing a head protection system in a motor vehicle having a structural member covered by an interior lining, said system comprising: a deformation element arranged between said structural member and said interior lining; and an air bag disposed between said deformation element and said structural member.

This and other objects have been achieved according to the present invention by providing a method of making a head protection system in a motor vehicle having a structural member covered by an interior lining, said method comprising the acts of: (a) arranging a deformation element between said structural member and said interior lining; and (b) arranging an air bag between said deformation element and said structural member.

Other objects, advantages and novel features of the present invention will become apparent from the following detailed description of the invention when considered in conjunction with the accompanying drawings.

DETAILED DESCRIPTION OF THE DRAWINGS

Figure 1:
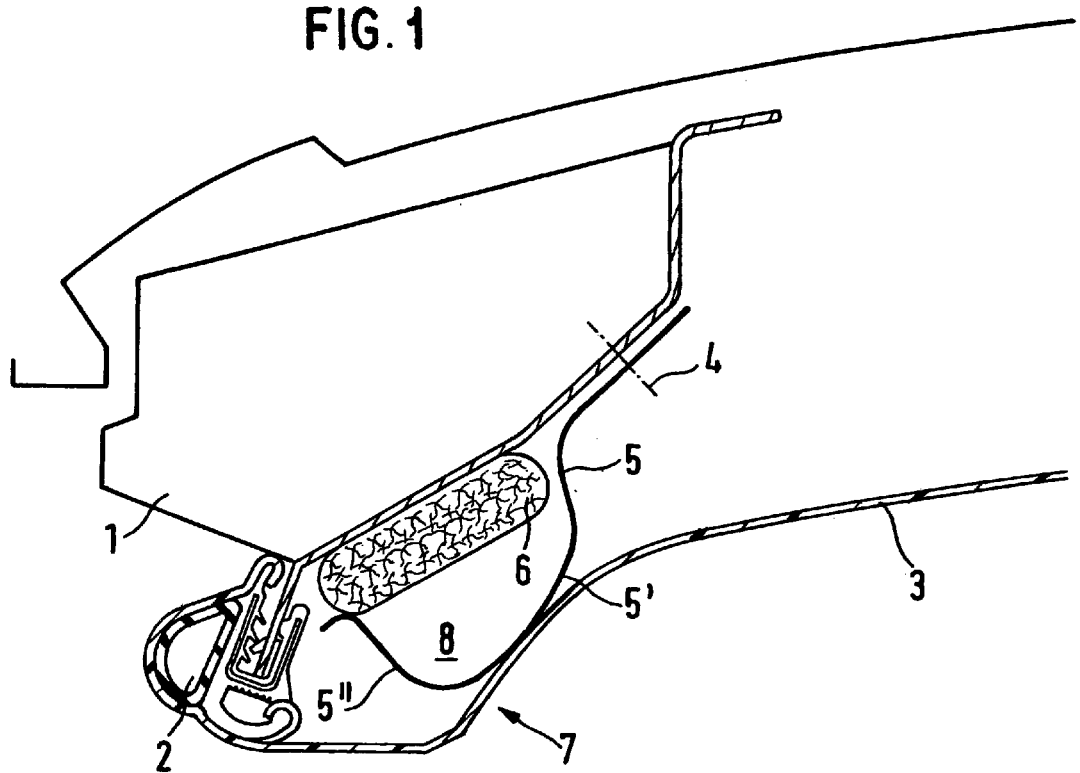
FIG. 1 is a sectional view of a motor vehicle roof member with an attached deformation element and an air bag housed in-between according to a preferred embodiment of the present invention.

Reference number 1 indicates a roof member of a customary passenger car. According to FIGS. 1, 2, this is a sectional view, for example, of the area between the A-column known to a person skilled in the art and the B-column. On the lower exterior side of this member 1, a sealing structure 2 for a door opening is situated. In addition, reference number 3 indicates an inside roof lining below which the vehicle interior is situated.

On the side of the member 1 facing the vehicle interior, a deformation element 5 is mounted by means of a threaded connection 4, i.e., the deformation element is screwed to the roof member 1. The deformation element 5—like the member 1—extends perpendicularly to the plane of the drawing along its longitudinal direction. Here, this deformation element 5 is covered by the inside lining 3 of the roof. An air bag 6 of an inflatable head protection system is housed in the non-inflated condition between the deformation element 5 and the member 1. In this case, this air bag 6, which may be constructed analogous to that of International Patent Document WO 94/19215 and may be wrapped in a protective hose, is held by the deformation element 5.

Figure 2:
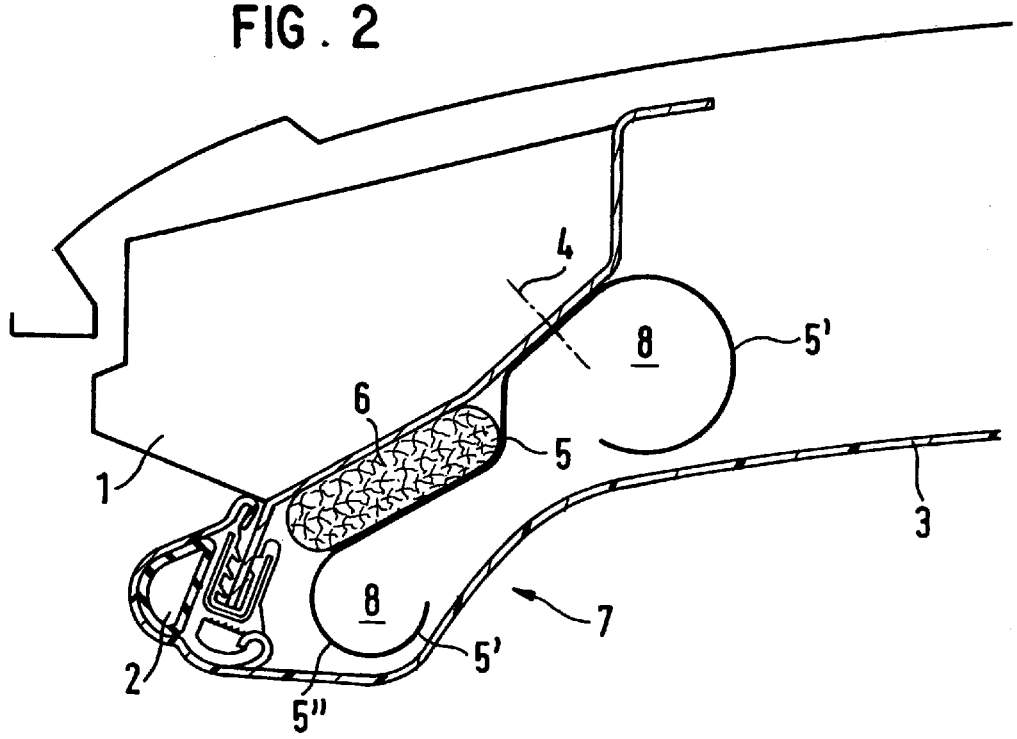
FIG. 2 is a sectional view of a motor vehicle roof member with an attached deformation element and an air bag housed in-between according to another preferred embodiment of the present invention.
Figure 3:
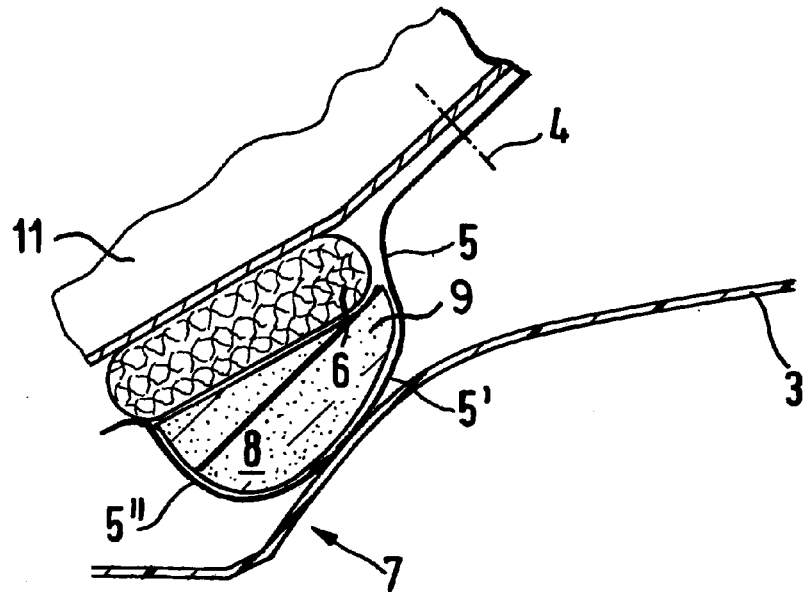
FIG. 3 is a sectional view of a motor vehicle column with an attached deformation element similar to the embodiment of FIG. 1.
Figure 4:
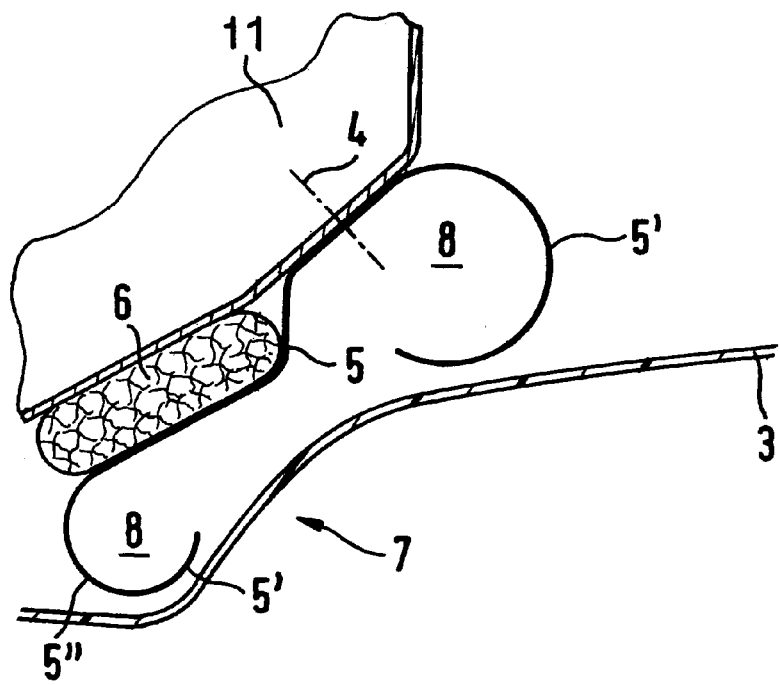
FIG. 4 is a sectional view of a motor vehicle column with an attached deformation element similar to the embodiment of FIG. 2.

The deformation element 5 itself is a shaped sheet metal part which, in the embodiment according to FIGS. 1 and 3, has one deformation curvature 5' and, in the embodiment according to FIGS. 2 and 4, has two deformation curvatures 5' located at mutually opposite sides of the deformation element. In the embodiment of FIGS. 2 and 4, a central portion of the deformation element 5 located between the deformation curvatures 5' is coupled to the roof member 1 or column 11. The deformation curvatures 5' have a convex shape such that, in the event of the impact of a vehicle occupant's head in the direction of the arrow 7, an energy-absorbing deformation of this deformation element takes place so that this head impact is absorbed in a damping manner. This minimizes the risk of injury to a vehicle occupant. Simultaneously, at least one leg 5" of this deformation element is constructed to be so soft and flexible that this leg 5" is deformed by an inflating operation of the air bag 6 and is bent away essentially against the direction of the arrow 7 in order to permit the air bag 6 to peel itself out of this illustrated inoperative position and reach the inflated position which exercises a protective function. This position may, for example, be as indicated in previously mentioned International Patent Document WO 94/19215. Naturally, the inside roof lining 3 is also moved against the direction of the arrow 7 during this inflating operation of the air bag 6. In the embodiment of FIGS. 2 and 4, the interior lining 3 is engagable with the deformation curvatures 5' such that a deformation zone is defined between the interior lining and the central portion.

In order to further increase the damping effect of the deformation element 5, a hollow space 8 formed by this deformation element 5 or by this shaped sheet metal part may additionally be filled with foamed material 9, as shown in FIG. 3. In the embodiment of FIGS. 1 and 3, the hollow space 8 is open in a direction facing the roof member 1 or column 11. In the embodiment of FIGS. 2 and 4, the hollow spaces 8 are open in a direction facing each other. Although the hollow spaces 8 are not closed on all sides, it is ensured that, in the event of deformation of the deformation element 5—whether caused by an impact in the direction of the arrow 7 or by an inflating of the air bag 6—no crumbling foam material can reach the vehicle interior because flying particles of crumbled foam are undesirable. This deformation element 5, which is constructed as a shaped sheet metal part, therefore holds back the foam material which exercises an additional damping function and prevents it from crumbling.

In the case of the described arrangement, synergistic effects are therefore utilized such that a required deformation element, specifically the element 5, is simultaneously capable of holding the air bag 6 of an inflatable head protection system. In this case, the deformation elements constructed as shaped sheet metal parts are designed such that they deform in a targeted manner—for example, also in the event of the impact of a test body within the scope of the initially described head impact tests—and in the process convert energy. At the same time, these deformation elements 5 are shaped such that they fix the air bag 6, which is situated in the roof area of the motor vehicle, in the inoperative condition in the construction position and, when this head protection system is triggered, that is, when the air bag 6 is inflated, release the air bag in the direction of the vehicle interior. This arrangement may not only take place—as illustrated and described—in the area of the roof member 1 of a passenger car but also in the area of the A-column, the B-column and the C-column. The available space is always utilized optimally. Additional advantages are a reduced formation of variants and particularly also an improved protection of the air bag 6 from damage in the inoperative condition. The deformation element or generally an energy-absorbing section as well as the air bag 6 can be easily fastened on the vehicle body in this manner. It should also be pointed out that naturally a plurality of details, particularly of a constructive type, may definitely be designed to differ from the illustrated embodiment without leaving the content of the claims.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Arrangement of an inflatable head protection system in a motor vehicle, comprising an air bag which is provided at least partly along a vehicle body roof member or a vehicle body column in a non-inflated condition following the course of said roof member or column, wherein the air bag is held by a separate deformation element coupled to said roof member or column such that the air bag is disposed between the deformation element and the roof member or column, said deformation element including at least one deformation curve defining a hollow space between said air bag and an interior lining which covers said roof member or column.

2. Arrangement according to claim 1, wherein the deformation element has a leg which can be deformed by inflation of the air bag.

3. Arrangement according to claim 1, wherein said hollow space is filled with a foam material.

4. Arrangement according to claim 3, wherein said hollow space is open.

5. Arrangement according to claim 1, wherein said deformation element is a shaped sheet metal part.

6. Arrangement of an inflatable head protection system in a motor vehicle, comprising an air bag which is provided at least partly along a vehicle body member or a vehicle body column in a non-inflated condition following the course of said member or column, wherein the air bag is held by separate deformation element, wherein the deformation element is a shaped sheet metal part which is screwed to the member or the column and has at least one deformation curvature, and wherein the air bag is housed essentially between the deformation element and the member or the column.

7. Arrangement according to claim 6, wherein the deformation element has a leg which can be deformed by inflation of the air bag.

8. A head protection system in a motor vehicle having a vehicle body roof member or a vehicle body column covered by an interior lining, said system comprising:
   a deformation element coupled to said roof member or column; and
   an air bag disposed between said deformation element and said roof member or column, said deformation element supporting said air bag,
   said deformation element including at least one deformation curve defining a hollow space between said air bag and said interior lining.

9. A head protection system according to claim 8, wherein said hollow space is open in a direction facing said roof member or column.

10. A head protection system according to claim 9, wherein said air bag is arranged adjacent said hollow space.

11. A head protection system according to claim 8, wherein said at least one deformation curve comprises two deformation curves, said two deformation curves being located at mutually opposite sides of said deformation element, said two deformation curves defining two respective hollow spaces.

12. A head protection system according to claim 11, wherein said two hollow spaces are open in a direction facing each other.

13. A head protection system according to claim 11, wherein said deformation element includes a central portion located between said two deformation curves, said central portion being coupled to said roof member or column, said interior lining being engageable with said two deformation curves such that a deformation zone is defined between said interior lining and said central portion.

14. A head protection system according to claim 8, wherein said deformation element is a shaped sheet metal part.

15. A method of making a head protection system in a motor vehicle having a roof member or column covered by an interior lining, said method comprising the acts of:

(a) arranging a deformation element between said roof member or column and said interior lining and coupling said deformation element to said roof member or column; and (b) arranging an air bag between said deformation element and said roof member or column such that said air bag is supported by said deformation element, said deformation element including at least one deformation curve defining a hollow space between said interior lining and said air bag.

16. A method according to claim 15, wherein said deformation element is arranged such that said hollow space is open in a direction facing said roof member or column.

17. A method according to claim 16, wherein said air bag is arranged adjacent said hollow space.

18. A method according to claim 15, wherein said at least one deformation curve comprises two deformation curves, said two deformation curves being located at mutually opposite sides of said deformation element, said two deformation curves defining two respective hollow spaces.

19. A method according to claim 18, wherein in act (a) said deformation element is configured and arranged to include a central portion located between said two deformation curves, said central portion being coupled to said roof member or column, said interior lining being engageable with said two deformation curves such that a deformation zone is defined between said interior lining and said central portion.

20. A method according to claim 15, wherein said deformation element is a shaped sheet metal part.

* * * * *